United States Patent
Alshinnawi et al.

(10) Patent No.: US 9,514,009 B2
(45) Date of Patent: Dec. 6, 2016

(54) REDUCING SERVER POWER CONSUMPTION TO COMPENSATE FOR A POWER SUPPLY FAILURE IN A MULTIPLE POWER SUPPLY CONFIGURATION

(71) Applicant: Lenovo Enterprise Solutions (Singapore) Pte. Ltd., Singapore (SG)

(72) Inventors: Shareef F. Alshinnawi, Apex, NC (US); Gary D. Cudak, Wake Forest, NC (US); Edward S. Suffern, Chapel Hill, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 164 days.

(21) Appl. No.: 14/339,496

(22) Filed: Jul. 24, 2014

(65) Prior Publication Data

US 2016/0026549 A1   Jan. 28, 2016

(51) Int. Cl.
  *G06F 11/20*   (2006.01)
  *G06F 1/30*    (2006.01)

(52) U.S. Cl.
  CPC ............. *G06F 11/2015* (2013.01); *G06F 1/30* (2013.01); *G06F 2201/85* (2013.01)

(58) Field of Classification Search
  CPC ........... G06F 11/2015; G06F 1/30; G06F 1/28
  (Continued)

(56) References Cited

U.S. PATENT DOCUMENTS

| 4,270,168 A | 5/1981 | Murphy et al. |
| 5,608,275 A | 3/1997 | Khosrowpour |

(Continued)

FOREIGN PATENT DOCUMENTS

| JP | 2000165419 A | 6/2000 |
| JP | 2011065389 A | 3/2011 |

(Continued)

OTHER PUBLICATIONS

NEC Corp. "Network Proxy Reply Server, Network System, and Method for Reducing Power Consumption of This Network System", JP2000165419A English Abstract, Jun. 16, 2006, 13 pages.

(Continued)

*Primary Examiner* — Thomas Lee
*Assistant Examiner* — Aaron J Browne
(74) *Attorney, Agent, or Firm* — Katherine S. Brown; Jeffrey L. Streets (57) ABSTRACT

A method includes supplying power to a physical server from a plurality of power supplies, wherein operation of all hardware components of the server requires more power than any one of the power supplies can provide. A plurality of jobs are run on the server while the plurality of power supplies are supplying power to the physical server. The method further comprises identifying an amount of power required by each of the components, and identifying one or more components that are not required by one or more of the jobs that are running on the server. The method detects a loss of power from one of the power supplies and then selectively removes power from hardware components identified as not required so that at least a central processing unit and a memory device can continue running at least one job using power available from the operational power supplies.

20 Claims, 4 Drawing Sheets

(58) Field of Classification Search
USPC .................................. 713/310, 324; 714/14
See application file for complete search history.

(56) References Cited

U.S. PATENT DOCUMENTS

| | | | |
|---|---|---|---|
| 6,757,748 | B1 | 6/2004 | Hipp |
| 7,701,245 | B1 | 4/2010 | Vasudevan |
| 8,751,836 | B1* | 6/2014 | Piszczek ............... G06F 1/3268 713/300 |
| 2008/0104430 | A1* | 5/2008 | Malone ................. G06F 1/3203 713/300 |
| 2009/0077407 | A1 | 3/2009 | Akimoto |
| 2009/0119523 | A1* | 5/2009 | Totten ....................... G06F 1/32 713/322 |
| 2009/0307512 | A1* | 12/2009 | Munjal ..................... G06F 1/30 713/324 |
| 2010/0036998 | A1* | 2/2010 | Ben-Rubi ............. G06F 3/0625 711/100 |
| 2012/0054766 | A1* | 3/2012 | de Dinechin ......... G06F 9/5088 718/104 |
| 2012/0137289 | A1* | 5/2012 | Nolterieke .......... G06F 9/45558 718/1 |
| 2012/0188871 | A1* | 7/2012 | Liu ....................... H04L 12/413 370/230 |
| 2012/0239323 | A1* | 9/2012 | McGrane .............. G06F 1/3206 702/62 |
| 2012/0331202 | A1 | 12/2012 | Cohen et al. |
| 2013/0268861 | A1* | 10/2013 | Bailey .................. G06F 9/5072 715/735 |

FOREIGN PATENT DOCUMENTS

| | | |
|---|---|---|
| JP | 2011129167 A | 6/2011 |
| JP | 2012168675 A | 9/2012 |

OTHER PUBLICATIONS

Murata Machinery, "Web Server Device, and Control Method and Program of Web Server Device", JP2011065389A English Abstract, Mar. 31, 2011, 12 pages.
Casio Computer Co Ltd, "Client device and program", JP2011129167A English Abstract, Jun. 30, 2011, 21 pages.
Seikatsu Kyodo Kumiai, "Electric Power Management Server, and Electric Power Management Program" JP2012168675A English Abstract, Sep. 6, 2012, 20 pages.
Server Technology, Inc., "Server Technology's Energy Management Solution for Cabinet Distribution Units (CDUs) in the Cisco Energywise Network(TM)", www.servertech.com, 3003-9999-21 Rev A (020112), 2012, 6 pages. (This document only identifies the year of publication is sufficiently earlier than the effective U.S. filing date and any foreign priority date so that the particular month of publication is not in issue. See MPEP 609.04(a)).
"The Problem of Power Consumption in Servers", http://www.infoq.com/articles/power-consumption-servers, Mar. 28, 2014, 26 pages.
Sudhanva Gurumurthi et al., "Reducing Disk Power Consumption in Servers with DRPM", Published by the IEEE Computer Society, 0018-9162/03, Dec. 2003, pp. 41-48.
The Green Grid Editor: Mark Blackburn, 1E "Five Ways to Reduce Data Center Server Power Consumption", White paper #7, Rev 2008-0, pp. 1-11. (This document only identifies the year of publication (without the month), but the year of publication is sufficiently earlier than the effective U.S. filing date and any foreign priority date so that the particular month of publication is not in issue. See MPEP 609.04(a)).

* cited by examiner

| Rank | Components | Operational power consumption in watts | Reduced power consumption in watts | Comments |
|---|---|---|---|---|
| 1 | CPU1 | 135 | 115 | Reduce memory bus speed |
| 1 | CPU2 | 135 | 115 | Reduce memory bus speed |
| 1 | Memory DIMM1 16 GB Channel 1 @ 1866 MHz | 15 | 10 | 1333 MHz |
| 1 | Memory DIMM1 16 GB Channel 2 @ 1866 MHz | 15 | 10 | 1333 MHz |
| 4 | Memory DIMM1 16 GB Channel 3 @ 1866 MHz | 15 | 0 | DIMM-kill |
| 1 | Memory DIMM1 16 GB Channel 1 @ 1866 MHz | 15 | 10 | 1333 MHz |
| 1 | Memory DIMM1 16 GB Channel 2 @ 1866 MHz | 15 | 10 | 1333 MHz |
| 4 | Memory DIMM1 16 GB Channel 3 @ 1866 MHz | 15 | 0 | DIMM-kill |
| 1 | Memory DIMM1 16 GB Channel 1 @ 1866 MHz | 15 | 10 | 1333 MHz |
| 1 | Memory DIMM1 16 GB Channel 2 @ 1866 MHz | 15 | 10 | 1333 MHz |
| 4 | Memory DIMM1 16 GB Channel 3 @ 1866 MHz | 15 | 0 | DIMM-kill |
| 2 | HDD 1-3 TB @ 7200 PRM | 9.5 | 6.4 | Reduce speed |
| 2 | HDD 1-3 TB @ 7200 PRM | 9.5 | 6.4 | Reduce speed |
| 3 | Mezz card Infiniband FDR | 25 | 20 | Reduce speed to QDR |
| 4 | PCIe adapter-dual port 10 GbE | 25 | 15 | Disable one port |
| 4 | PCIe adapter-dual port 10 GbE | 25 | 15 | Disable one port |
| 1 | PCIe adapter-GPGPU | 225 | 225 | No Change |
| 1 | PICe adapter-Flash memory | 25 | 25 | No Change |
| 1 | PICe adapter-Flash memory | 25 | 25 | No Change |
| | | Two 750-watt supplies | One failed 750-watt supply | |
| | | Total: 774 | Total: 627.8 | |

REDUCING SERVER POWER CONSUMPTION TO COMPENSATE FOR A POWER SUPPLY FAILURE IN A MULTIPLE POWER SUPPLY CONFIGURATION

BACKGROUND

Field of the Invention

The present invention relates to methods of providing power to a computer, and more specifically to methods of handling a power supply failure in a multiple power supply configuration.

Background of the Related Art

Many modern servers can use multiple power supplies to supply power to the server. In some configurations, two power supplies provide redundancy in case either one of the power supplies fail. In other words, a redundant power supply is always idle just in case a primary power supply fails. In other cases two power supplies may be required in order to power a server with a certain hardware configuration. If one power supply fails in this latter case, then the entire server may go down.

BRIEF SUMMARY

One embodiment of the present invention provides a method comprising supplying power to a physical server from a plurality of power supplies, wherein operation of all hardware components of the physical server requires more power than any one of the power supplies can provide. A plurality of jobs are run on the physical server while the plurality of power supplies are supplying power to the physical server. The method further comprises identifying an amount of power required by each of the hardware components of the physical server, and identifying one or more hardware components of the physical server that are not required by one or more of the jobs that are running on the physical server. The method detects a loss of power from one of the power supplies and then, in response to detecting the loss of power, selectively removes power from the one or more hardware components identified as not required so that at least a central processing unit and at least a memory device can continue running at least one of the jobs using power available from the power supplies that remain operational.

DETAILED DESCRIPTION

One embodiment of the present invention provides a method comprising supplying power to a physical server from a plurality of power supplies, wherein operation of all hardware components of the physical server requires more power than any one of the power supplies can provide. A plurality of jobs are run on the physical server while the plurality of power supplies are supplying power to the physical server. The method further comprises identifying an amount of power required by each of the hardware components of the physical server, and identifying one or more hardware components of the physical server that are not required by one or more of the jobs that are running on the physical server. The method detects a loss of power from one of the power supplies and then, in response to detecting the loss of power, selectively removes power from the one or more hardware components identified as not required so that at least a central processing unit and at least a memory device can continue running at least one of the jobs using power available from the power supplies that remain operational.

Modern physical servers are often designed with multiple power supplies. Depending on the configuration of a physical server, these multiple power supplies can be used in a redundant configuration. However, in a redundant configuration the power consumption of the installed hardware components of the physical server must be less than the amount of power that is supplied by n−1 of the power supplies, where n is the total number of power supplies dedicated to the physical server. On the other hand, if the full operation of the physical server configuration requires use of all the power supplies, then there is no redundancy in the power circuitry.

In one option, each of the power supplies communicates its operational status to a baseboard management controller. Accordingly, the baseboard management controller may immediately detect a loss of power from any of its power supplies. In a further option, the baseboard management controller may instruct the basic input/output system (BIOS) to reduce an operational parameter of at least one of the hardware components of the physical server. For example, the operational parameter may be selected from processor speed, memory speed, link speed, a number of memory module channels and a PCIe adapter.

In another option, a baseboard management controller may gather an inventory of installed hardware components of the physical server, such as upon power up of the physical server. For example, the inventory of installed hardware components may identify, for each hardware component, a component type and a power consumption amount. Furthermore, each hardware component may have more than one operating mode with a separate power consumption level, such as a full power consumption level and a reduced power consumption level. Methods of the present invention may selected a power level for each hardware component that allows the physical server to operate on the power that is available after the loss of power from one power supply, with the option of selecting a reduced power consumption level for one or more of the hardware components. Furthermore, the baseboard management controller may identify a power capacity amount for each of the power supplies. Accordingly, the baseboard management controller is able to determine how much power is available after one of the power supplies has failed.

Various embodiments of the method may further comprise migrating a first job from the physical server to another physical server, wherein the first job was using the identified hardware components prior to migration, and continuing to run a second job on the physical server, wherein the second job does not use the identified hardware components. Accordingly, the first job is no longer run on the physical server that is experiencing a loss of power from one of its power supplies, but the second job can be run on the physical server without use of the identified hardware components.

Other embodiments of the method may further comprise initially assigning a priority level to the hardware components in the physical server based on power consumption, and dynamically changing the priority level assigned to the hardware components as a function of hardware requirements of one or more jobs running on the server. For example, upon startup of the physical server, the hardware components with the highest power consumption may be given the highest priority level. In many configurations, this might mean that the processor(s) and memory modules would be initially given the highest priority level and would be the hardware components that are the least likely to be turned off or given a reduced operating mode. However, the priority levels assigned to the hardware components may later be dynamically changed to reflect the hardware requirements of the jobs running on the physical server at any particular point in time. Accordingly, the hardware components that will be turned off or put in a reduced operating mode may depend upon the various jobs that are running on the physical server at that moment. Removing power from a hardware component may include turning off the hardware component or changing an operating state of the hardware component, such as putting the hardware component in an idle state or some other reduced power state.

Yet other embodiments of the method may consider whether or not a job is associated with a service level agreement and the level of performance required by such agreement. For example, the method may further comprise identifying a first job associated with a first service level agreement and a second job associated with a second service level agreement, wherein the first service level agreement has lower performance requirements than the second service level agreement. The method may then migrate or provision the first job to a physical server that will power off components in response to a loss of power from one of the power supplies. Similarly, the method may migrate or provision the second job to a physical server that will not power off components in response to a loss of power from one of the power supplies.

A still further embodiment of the method may comprise immediately throttling the processor of the physical server in response to detecting a loss of power from one of the power supplies and, after the identified server hardware components have been powered off, continuing to run a second job on the physical server without throttling the processor, wherein the second job does not use the identified hardware components. In other words, the processor may be throttled immediately after detecting a loss of power so that the physical server does not demand more power than is available. However, after power has been removed from the identified hardware components, the second job may be run without throttling the processor. A similar embodiment of the method may immediately throttle the processor of the physical server in response to detecting a loss of power from one of the power supplies, then migrating a first job from the physical server to another physical server, wherein the first job used the hardware components being powered off, and then, after the identified hardware components have been powered off, continue running a second job on the physical server without throttling the processor, wherein the second job does not use the identified hardware components.

Methods of the present invention may further comprise assigning a priority level to each of the hardware components of the physical server. In one option, a priority level is assigned to one or more reduced operating level of one or more of the hardware components of the physical server such that, depending upon the amount of available power, one or more of the hardware components may remain operational at the reduced operating level. This may allow a job to use the particular hardware without allowing the particular hardware components to run at full power. In a non-limiting example, the method may maintain data including a normal power consumption amount and a reduced power consumption amount for the one or more hardware components having a reduced operating level that has been assigned a priority level. In other words, each operating level of a hardware component may be associated with a different power consumption amount. As a first specific example, a first portion of memory installed in the physical server may be assigned a higher priority than a second portion of memory installed in the physical server. Accordingly, the first portion of memory is less likely to be turned off or have power removed. As a second specific example, a reduced link speed of a network adapter may be assigned a higher priority than a full link speed of the network adapter, such that the adapter is likely to continue operating, but perhaps at a reduced link speed.

Methods of the present invention may also assign a priority level to each of a plurality of the hardware components of the physical server as a function of the hardware components that are required by an application running on the physical server. In other words, the hardware components required by the application may be given the highest priority. In a specific example, a workload manager may adjust the priority level assigned to each of the plurality of hardware components of the physical server in response to the workload manager starting an application on the physical server.

Another embodiment of the present invention provides a computer program product for controlling an autonomous vehicle, the computer program product comprising a computer readable storage medium having program instructions embodied therewith, the program instructions executable by a processor to cause the processor to perform a method. The method comprises supplying power to a physical server from a plurality of power supplies, wherein operation of all hardware components of the physical server requires more power than any one of the power supplies can provide. A plurality of jobs are run on the physical server while the plurality of power supplies are supplying power to the physical server. The method further comprises identifying an amount of power required by each of the hardware components of the physical server, and identifying one or more hardware components of the physical server that are not required by one or more of the jobs that are running on the physical server. The method detects a loss of power from one of the power supplies and then, in response to detecting the loss of power, selectively removes power from the one or more hardware components identified as not required so that at least a central processing unit and at least a memory device can continue running at least one of the jobs using power available from the power supplies that remain operational.

The foregoing computer program products may further include computer readable program code for implementing or initiating any one or more aspects of the methods described herein. Accordingly, a separate description of the methods will not be duplicated in the context of a computer program product.

Figure 1:
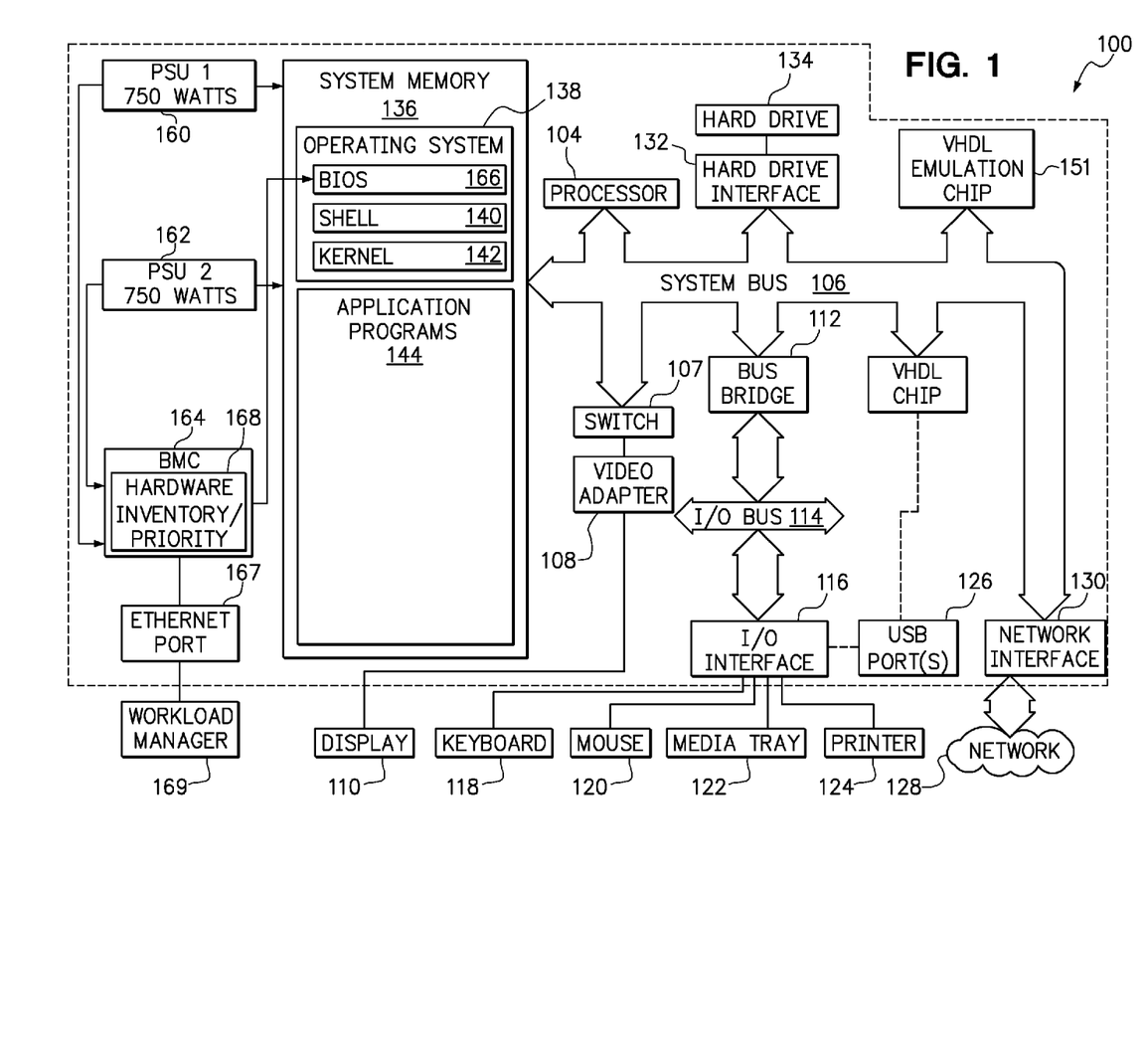
FIG. 1 is a diagram of a physical server according to one embodiment of the present invention.

FIG. 1 is a diagram of a computer 100 that is a non-limiting example of a physical server according to one embodiment of the present invention. Computer 100 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in a preferred embodiment some or all of these ports are universal serial bus (USB) ports. As depicted, the computer 100 is able to communicate over a network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

The operating system 138 may include a shell 140, for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 is a text-based, line-oriented user interface, the present invention will equally well support other user interface modes, such as graphical, voice, gestural, etc.

As depicted, the OS 138 also includes a kernel 142, which includes lower levels of functionality for the OS 138, including providing essential services required by other parts of the OS 138 and other application programs and data storage. As shown, the computer 100 may take the form of a physical server.

Also stored in the system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes the VHDL program 139 to configure the VHDL chip 137, which may be an FPGA, ASIC, or the like.

In another embodiment of the present invention, execution of instructions from VMPP 148 results in a utilization of VHDL program 139 to program a VHDL emulation chip 151. VHDL emulation chip 151 may incorporate a similar architecture as described above for VHDL chip 137. Once VMPP 148 and VHDL program 139 program VHDL emulation chip 151, VHDL emulation chip 151 performs, as hardware, some or all functions described by one or more executions of some or all of the instructions found in VMPP 148. That is, the VHDL emulation chip 151 is a hardware emulation of some or all of the software instructions found in VMPP 148. In one embodiment, VHDL emulation chip 151 is a programmable read only memory (PROM) that, once burned in accordance with instructions from VMPP 148 and VHDL program 139, is permanently transformed into a new circuitry that performs the functions needed to perform the processes of the present invention.

The hardware elements depicted in computer 102 are not intended to be exhaustive, but rather are representative components suitable to perform the processes of the present invention. For instance, computer 102 may include alternate memory storage devices such as magnetic cassettes, digital versatile disks (DVDs), Bernoulli cartridges, and the like. These and other variations are intended to be within the scope of the present invention.

As shown in FIG. 1, the computer 100 further includes two power supplies 160, 162 that provide electrical power to the hardware components of the computer 100. Each power supply can communicate its operational status to a baseboard management controller (BMC) 164. Also, the BMC 164 has a path to communicate with the basic input/output system (BIOS) 166. In the present example, each of the two power supplies 160, 162 can provide up to 750 Watts of power such that a maximum of 1500 Watts can be supplied to the hardware components of the computer 100. Upon power up of the computer 100, the baseboard management controller (BMC) 164 may gather an inventory 168 of hardware components installed in the physical server 100, which may identify the configuration and power consumption of the major hardware components of the server as well as the amount of power that can be supplied by each power supply. A workload manager 169 can communicate with the BMC 164 through an Ethernet connection to an Ethernet port 167, for example to provide input used to dynamically change the rank of hardware components according to the applications assigned to be run on the computer.

Figure 2:
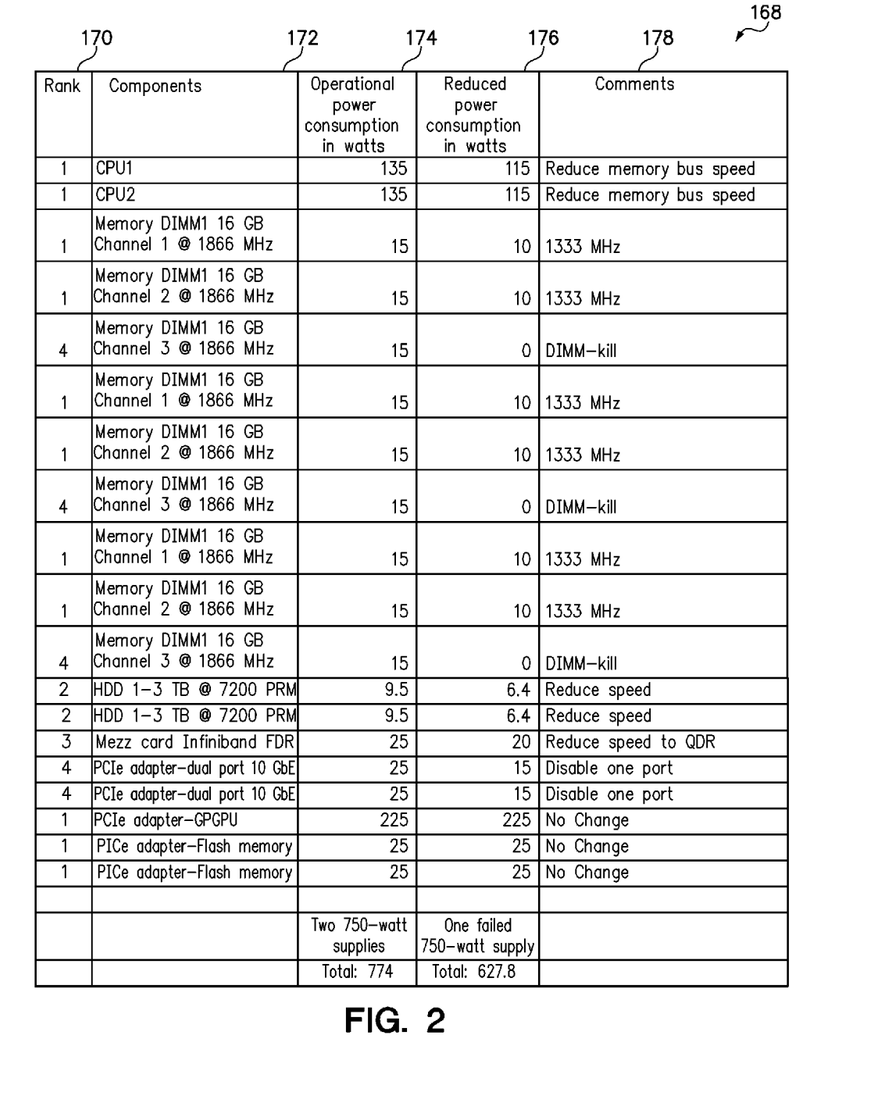
FIG. 2 is a table illustrating a hardware inventory for a physical server, including power consumption values for full operation and reduced operation of each hardware component.

FIG. 2 is a table illustrating the hardware inventory 168, including power consumption values for full operation and a reduced operational state. In this example, the hardware components are identified (column 172) and assigned a rank or priority (column 170) indicating the importance of each component to the operation of the computer 100. For example, the CPUs (CPU1 and CPU2) and some of the memory (DIMMs on Channel 1 and Channel 2) may have a high importance (rank 1). However, additional large amounts of memory (DIMMs on Channel 3) may be less critical (rank 4) to applications running on the computer.

In a similar manner, connection to the Infiniband or Ethernet network may be critical, but perhaps only one of the ports in a multi-port adapter is required (see comment "Disable one port" in column 178). Or perhaps the link speed can be reduced to save power consumption (see comment "Reduce speed to QDR" in column 178, where QDR stand for Quad Data Rate). The same argument holds turn for other PCIe adapters such as flash memory or General Purpose Graphics Processing Units (GPGPUs). Also, the rank importance of these components may change with the current application executing on the server.

Furthermore, the hardware inventory 168 in FIG. 2 shows, for each hardware component, a normal operating power consumption (column 174) and a reduced power consumption (column 176). If the BMC detects that one of the power supplies is failing, then the BMC instructs the BIOS to reduce or remove power from one or more of the hardware components, such as reducing the processor speed, reducing the memory speed (from 1866 MHz to 1333 MHz), or removing one channel (Channel 3) of the DIMMs. As shown in the hardware inventory 168, the "Operational power consumption in watts" (column 174) is reduced to the "Reduced power consumption in watts" (column 176). This reduction in power consumption by various hardware components of the computer allows one or more critical jobs or applications to continue to run on the computer at reduced performance until the failing power supply can be replaced.

In the foregoing non-limiting example, the potential exists for the server to consume 774 Watts of power (see total at bottom of column 174). The 774 Watts are the peak wattage that the computer may consume. In actual operation, the power consumption of the hardware components will fluctuate. However, the methods of the present invention can react quickly to a power supply failure and reduce the power drawn by individual hardware components.

Figure 3:
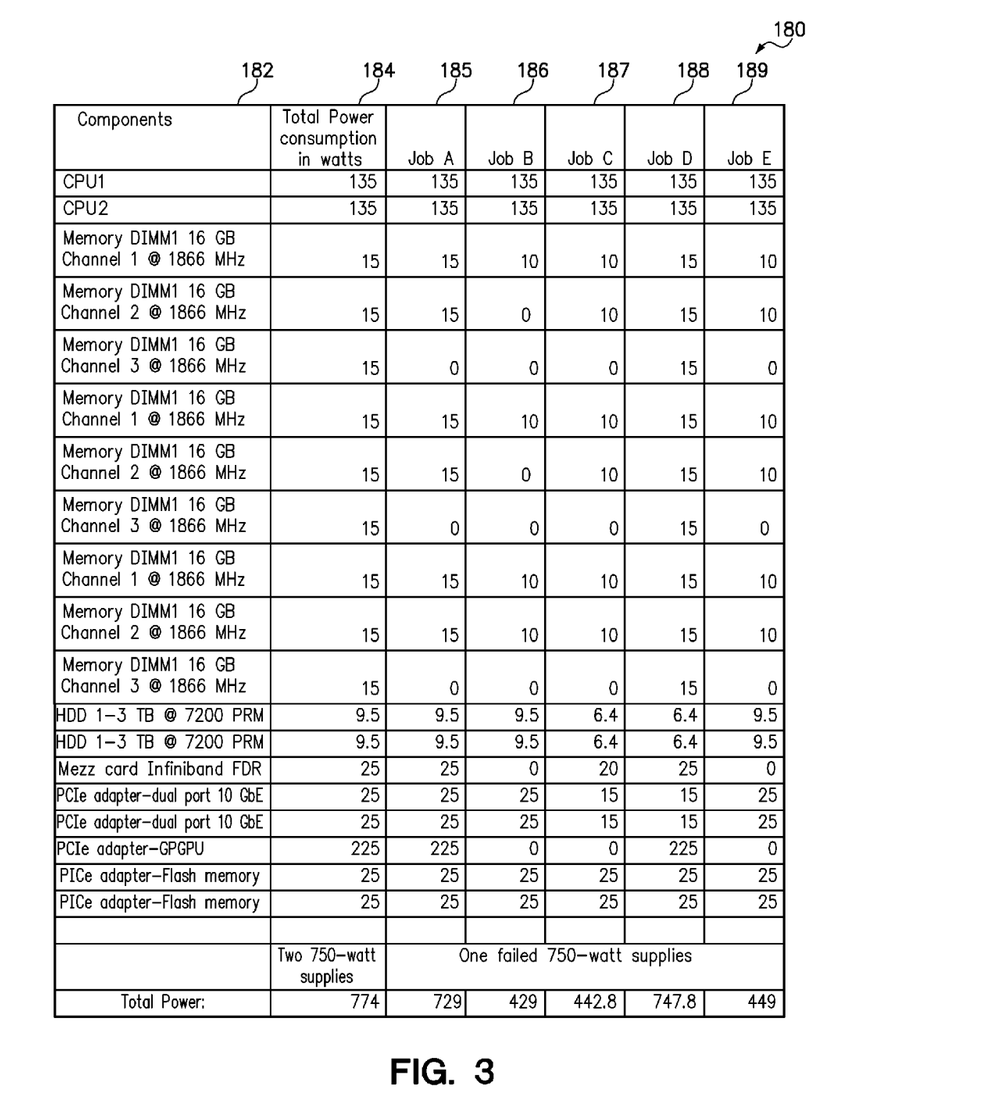
FIG. 3 is a table illustrating an alternative hardware inventory that identifies an amount of power required by each hardware component in order to run each of a plurality of jobs.

FIG. 3 is a table illustrating an alternative hardware inventory 180 that identifies each hardware component (column 182), the maximum power consumption of each hardware component (column 184), and a power consumption amount that required in order to run each of a plurality of jobs (Jobs A-E, columns 185-189). Assuming that multiple jobs are executing on the server, power must be supplied by both power supplies for all the scheduled jobs to execute (supply the maximum power of 774 Watts). The power consumption of each of the individual jobs A-E is shown at the bottom of each column 185-189. Specifically, Jobs B, C, E require fewer hardware components and require less performance such that their power consumption is much less than the 750 Watts of power available from the one remaining power supply. Accordingly, if one of the power supplies fails, Jobs A and D may, for example, be migrated off this server to a server having two operational power supplies, since the power consumption amounts of 729 Watts and 747.8 Watts, respectively, are very close to the maximum 750 Watts rating of the operational power supply. Conversely, Jobs B, C and E may continue to be run on this server without a degradation in performance. If Jobs A and D had not been migrated, then all jobs would suffer a performance degradation.

Note that the rank on power up may be the default rank of the hardware components (see rank in column 170 of table 168), this rank can be changed by a workload manager as the workload manager starts applications. Accordingly, the rank or priority of the hardware components may be dynamically changed to reflect the performance requirements of Jobs A-E.

Figure 4:
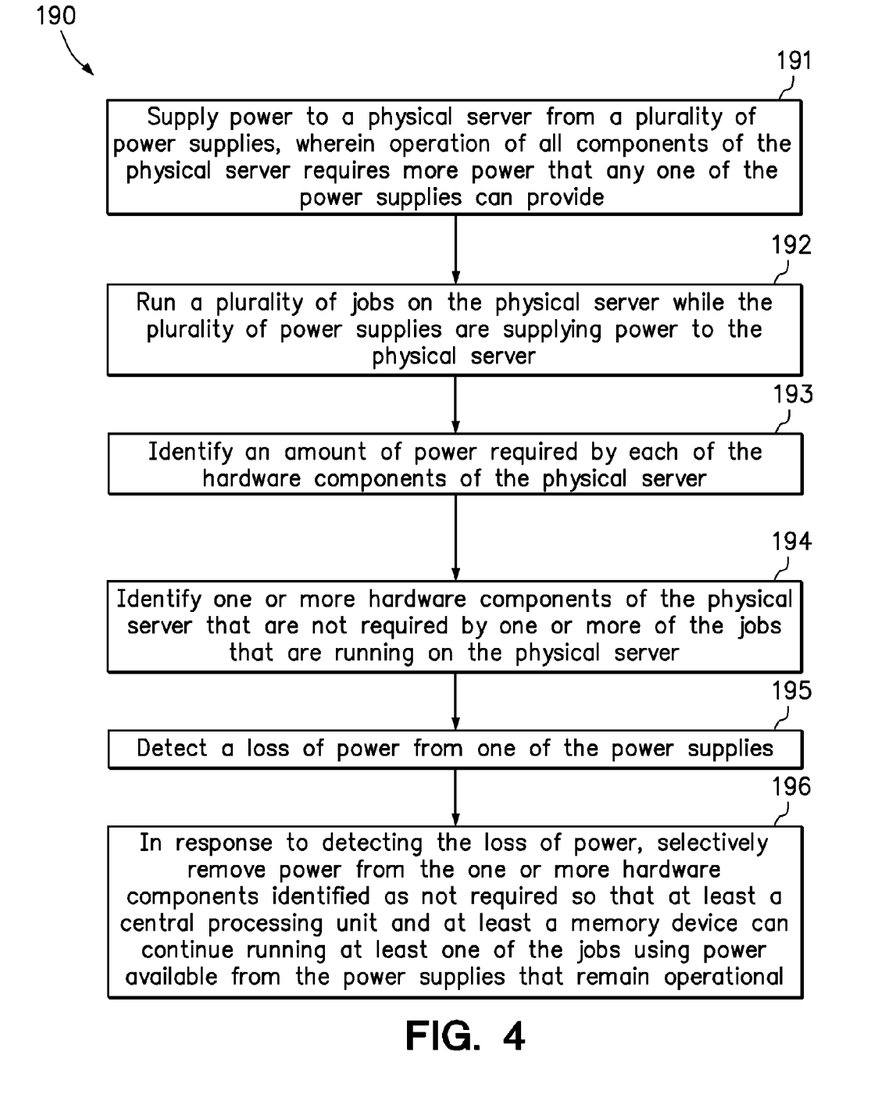
FIG. 4 is a flowchart of a method according to one embodiment of the invention.

FIG. 4 is a flowchart of a method 190 according to one embodiment of the invention. In step 191, power is supplied to a physical server from a plurality of power supplies, wherein operation of all components of the physical server requires more power than any one of the power supplies can provide. In step 192, a plurality of jobs are run on the physical server while the plurality of power supplies are supplying power to the physical server. In step 193, the method identifies an amount of power required by each of the hardware components of the physical server. In step 194, the method identifies one or more hardware components of the physical server that are not required by one or more of the jobs that are running on the physical server. When a loss of power from one of the power supplies is detected in step 195, then step 196 selectively removes power from the one or more hardware components identified as not required so that at least a central processing unit and at least a memory device can continue running at least one of the jobs using power available from the power supplies that remain operational. Once the failing power supply has been replaced, the server may return to it normal operating mode.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
supplying power to a physical server from a plurality of power supplies, wherein operation of all components of the physical server requires more power than any one of the power supplies can provide;
running a plurality of jobs on the physical server while the plurality of power supplies are supplying power to the physical server;
identifying an amount of power required by each of the hardware components of the physical server;
identifying one or more hardware components of the physical server that are not required by one or more of the jobs that are running on the physical server;
detecting a loss of power from one of the power supplies; and
in response to detecting the loss of power, selectively removing power from the one or more hardware components identified as not required so that at least a central processing unit and at least a memory device can continue running at least one of the jobs using power available from the power supplies that remain operational.

2. The method of claim 1, further comprising:
migrating a first job from the physical server to another physical server, wherein the migrated job was using the identified hardware components prior to migration; and
continuing to run a second job on the physical server, wherein the second job does not use the identified hardware components.

3. The method of claim 1, further comprising:
initially assigning a priority level to the hardware components in the physical server based on power consumption; and
dynamically changing the priority level assigned to the hardware components as a function of hardware requirements of one or more jobs running on the server.

4. The method of claim 1, wherein removing power from a hardware component includes changing an operating state of the hardware component.

5. The method of claim 1, wherein removing power from a hardware component includes putting the hardware component in an idle state.

6. The method of claim 1, further comprising:
identifying a first job associated with a first service level agreement and a second job associated with a second service level agreement, wherein the first service level agreement has lower performance requirements than the second service level agreement;
migrating or provisioning the first job to a physical server that will power off components in response to a loss of power from one of the power supplies; and
migrating or provisioning the second job to a physical server that will not power off components in response to a loss of power from one of the power supplies.

7. The method of claim 1, further comprising:
immediately throttling the processor of the physical server in response to detecting a loss of power from one of the power supplies; and
after the identified server hardware components have been powered off, continue running a second job on the physical server without throttling the processor, wherein the second job does not use the identified hardware components.

8. The method of claim 1, further comprising:
immediately throttling the processor of the physical server in response to detecting a loss of power from one of the power supplies; then
migrating a first job from the physical server to another physical server, wherein the migrated job used the hardware components being powered off; and then
after the identified hardware components have been powered off, continue running a second job on the physical server without throttling the processor, wherein the second job does not use the identified hardware components.

9. The method of claim 1, further comprising:
each of the power supplies communicating its operational status to a baseboard management controller on the physical server.

10. The method of claim 9, further comprising:
the baseboard management controller gathering an inventory of installed hardware components of the physical server upon power up of the physical server.

11. The method of claim 10, wherein the inventory of installed hardware components identifies, for each hardware component, a component type and a power consumption amount.

12. The method of claim 10, further comprising:
the baseboard management controller identifying a power capacity amount for each of the power supplies.

13. The method of claim 1, further comprising:
the baseboard management controller instructing the BIOS to reduce an operational parameter of at least one of the hardware components of the physical server, wherein the operational parameter is selected from processor speed, memory speed, link speed and a number of memory module channels.

14. The method of claim 1, further comprising:
assigning a priority level to each of the hardware components of the physical server.

15. The method of claim 1, further comprising:
assigning a priority level to one or more reduced operating level of one or more of the hardware components of the physical server.

16. The method of claim 15, further comprising:
maintaining data including a normal power consumption amount and a reduced power consumption amount for the one or more hardware components having a reduced operating level that has been assigned a priority level.

17. The method of claim 15, wherein a first portion of memory installed in the physical server is assigned a higher priority than a second portion of memory installed in the physical server.

18. The method of claim 15, wherein a reduced link speed of a network adapter is assigned a higher priority than a full link speed of the network adapter.

19. The method of claim 1, further comprising:
assigning a priority level to each of a plurality of the hardware components of the physical server as a function of the hardware components that are required by an application running on the physical server.

20. The method of claim 19, further comprising:
a workload manager adjusting the priority level assigned to each of the plurality of hardware components of the physical server in response to the workload manager starting an application on the physical server.

* * * * *